A. O. FOX & R. R. BATES.
PROCESS OF TREATING LIQUIDS.
APPLICATION FILED JULY 9, 1913.
1,114,875.
Patented Oct. 27, 1914.
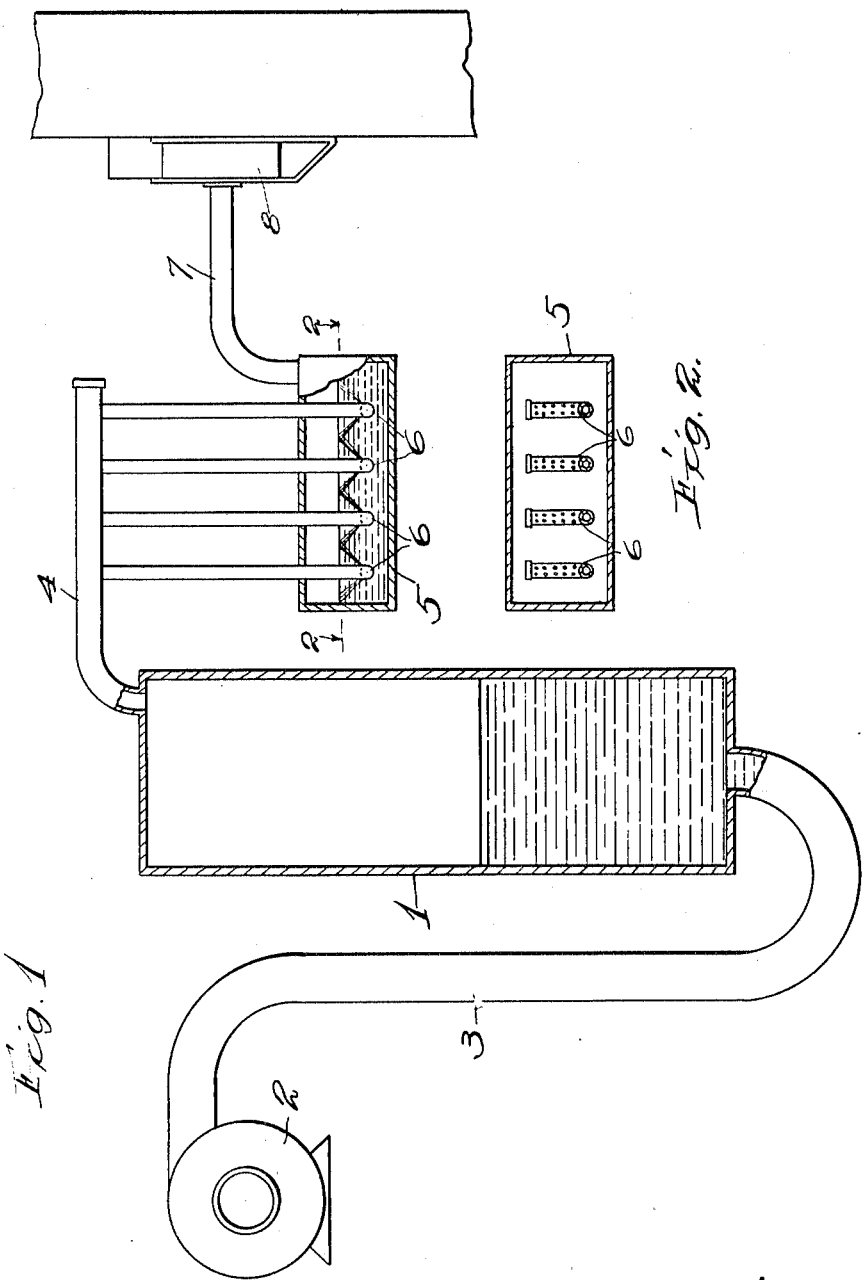
Witnesses:
O. F. Plummer
Denis A. Halters
Inventors:
Arthur O. Fox;
Russell R. Bates,
by
Parker & Carter
their Attys.

UNITED STATES PATENT OFFICE.

ARTHUR O. FOX AND RUSSELL R. BATES, OF MADISON, WISCONSIN, ASSIGNORS TO GENERAL PURIFICATION COMPANY, OF MADISON, WISCONSIN, A CORPORATION OF ARIZONA.

PROCESS OF TREATING LIQUIDS.

1,114,875. Specification of Letters Patent. Patented Oct. 27, 1914.

Application filed July 9, 1913. Serial No. 778,112.

*To all whom it may concern:*

Be it known that we, ARTHUR O. Fox and RUSSELL R. BATES, citizens of the United States, residing at Madison, in the county of Dane and State of Wisconsin, have invented a certain new and useful Improvement in Processes of Treating Liquids, of which the following is a specification.

This invention relates to a process of treating liquids, such as milk, cream, butter fats, bulk eggs and the like, and has for its object to provide a new and improved process of purification.

In the production of milk it is found, due to the fact that milk rapidly absorbs and develops injurious bacteria, and due to the conditions under which cows and dairy products are handled, that milk and its products contain numerous injurious germs, such as the pathogenic germs and various germs of putrescence injurious to health, and particularly injurious to the health of infants and invalids. The importance of producing milk and cream and butter free from these injurious and disease germs has resulted in the rigid inspection of milk and its products and the treatment of milk by the pasteurizing process for the purpose of destroying these injurious germs. It is found, however, that the pasteurizing process is very difficult to carry out practically because of the practical difficulty of properly maintaining the precise temperature required so that the milk is either not effectively purified or is overheated and rendered very difficult of digestion, particularly for infants. It is also found that pasteurization so affects certain substances in the milk and cream that when subsequently treated for the manufacture of butter, difficulties are encountered, such as flaky, oily, or salvy butter. It has also been found that heating or pasteurizing tends to kill off the organisms producing lactic acid and leaves unharmed certain injurious organisms which resist heating. These organisms, proteolytic in their nature, and producers of alkaline byproducts, are responsible for the production of ptomaines in milk. It has been found that such germs as these develop more rapidly in pasteurized milk than in the non-pasteurized, one of the reasons being that the germs which produce lactic acid are destroyed or vitiated and this beneficial byproduct is therefore not available in opposing the growth of the ptomaine producers. Eminent authorities agree that the development of so-called ptomaines is actually facilitated by pasteurization and have also demonstrated that the streptococcus, which has been responsible for so many epidemics of septic sore throat develops much more rapidly in pasteurized milk than in fresh unpasteurized milk. Unheated milk possesses a slight germicidal property which heated milk does not possess. Our process in no manner reduces the normal germicidal properties of fresh milk.

It is maintained that the enzyms in milk are seriously injured by pasteurization and that because of this and other injurious effects on milk by extreme heating it is rendered more difficult of digestion. For infants under one year and for invalids pasteurized milk is particularly unsatisfactory, and in fact under certain conditions injurious.

One of the objects of our invention is to provide a means for treating milk at any ordinary temperatures between 50 and 100 degrees Fahrenheit which purifies it and which destroys the pathogenic germs and the germs of putrescence without injuriously affecting the lactic acid organisms or the enzyms, and which in fact purifies and improves the milk and its products without in any manner injuring the milk or its products.

Another object of our invention is to provide a cheap and efficient method of treating cream or milk at ordinary temperatures by means of which the pathogenic germs and germs of putrescence are destroyed and noxious odors removed and the cream or milk rendered sweeter and more palatable and more healthful and proteolysis prevented, while at the same time so affecting the molecular condition of the cream that a more natural action of the lactic acid is induced and the development of ptomaines prevented.

When the age of cream used for manufacturing into butter exceeds a certain limit it becomes laden with very heavy, noxious odors, owing to the activity of the germs of putrefaction, and under these conditions the acids also injure the butter fat. By means of our invention these germs are destroyed, the products of putrefaction removed, further putrefaction and proteolysis prevented, and the cream or milk is left in a wholesome and palatable condition.

Another object of our invention is to provide cream which can be churned at lower temperatures than at which it is ordinarily churned and that may be churned more quickly into butter of choice flavor and high quality. It is desirous to churn cream at a comparatively low temperature so that the butter therefrom may be firm and of the proper consistency. In ordinary practice it is found that ordinary commercial cream can not be churned at a temperature lower than about 55 degrees Fahrenheit because of peculiar physical conditions, such as so-called gaseous foaming, etc., which render it impracticable, this gaseous foam filling the churn prevents proper agitation and its presence will not permit proper granulation of the cream into butter.

When cream is treated under our process its conditions are effectively changed before churning, the noxious gas forming germs are destroyed and removed from the cream before churning and the albumen surrounding the globules of butter fat is so acted upon that the butter fat is more easily affected by subsequent agitation of the cream in the churn. Upon treatment under our process the cream is in such condition that it may be churned at once. It may be reduced in temperature preferably to about 50 degrees Fahrenheit and may be then churned at a variety of temperatures below 50 degrees Fahrenheit. The particles of butter fat will begin at once to coalesce in the process of churning and wholesome butter of choice quality and flavor will be obtained in from twenty to forty minutes.

For purpose of illustration, we have shown in the accompanying drawings one form of apparatus for carrying out the process wherein—

Figure 1 is a view more or less diagrammatic illustrating such apparatus; Fig. 2 is a sectional view taken on line 2—2 of Fig. 1.

Our process may be carried out by subjecting hypochlorous acid gas to pressure and driving it through the milk or cream or other material to be treated. A means is also provided for exhausting or removing the gas as it passes through the cream, milk or other materials. The hypochlorous acid gas may be formed in any desired manner, as for instance by forcing ordinary air through a solution of one or more of the salts of hypochlorous acid diluted with pure water, or through an electrolytic combination of the salts of hypochlorous acid diluted with water. We have found that a solution of unstable salts of hypochlorous acid produces efficient results. When the hypochlorous acid gas is formed by the latter method ordinary air is forced through this solution and the resultant gas thus generated is then forced on under pressure through the milk, cream, or other liquid to be treated. By virtue of the peculiar action of this process and our method of application, hypochlorous acid gas is produced, liberated and passed through the treated fluid and becomes a potent element in producing the desired effect.

Referring now to the accompanying drawings wherein we have shown a simple apparatus for this purpose, we provide a vessel 1 into which the diluted liquid from which the hypochlorous acid gas is produced is placed. This receptacle is preferably provided with means for bringing air under pressure into intimate contact with the liquid as by means of fan 2 and pipe 3. The resultant gas then passes through a pipe 4 to a tank 5 containing the milk, cream or other liquid to be treated. The gas is brought into intimate contact with the liquid by any suitable means. As herein shown, the tank is provided at the bottom with several pipes 6 which are provided with a series of perforations directed upward, the apertures arranged to direct the gas from the pipes, toward a meeting point so that the liquid to be treated is agitated and the gas brought into intimate contact with the various particles thereof, passing directly through the liquid and discharging into the atmosphere or into a suitable conductor to carry it away. An exhaust fan 8 may be used if desired.

We have discovered that by means of this process, the pathogenic germs of milk will be destroyed without affecting the enzyms in the milk and without leaving any deleterious products in the milk or otherwise injuriously affecting it. We have also found that cream treated by this process churns at a lower temperature and produces a higher grade of butter and butter which will keep longer than the ordinary butter, and that in the cream so treated the germs of putrescence and the pathogenic bacteria are destroyed and proteolysis prevented while the lactic acid is not injured. This is very essential as the lactic acid is necessary to the production of butter in churning. We have also discovered that cream and milk in which foul odors have developed and putrescence has begun, when treated by our process becomes again free of odors and sweet, the putrefactive bacteria being destroyed and the products of putrefaction being removed without leaving behind any injurious or deleterious material or otherwise injuriously affecting the cream. In this process one of the prominent resultant gases driven off from the cream is hypochlorous acid gas thoroughly mixed with air and that there is no free chlorin found anywhere throughout the process. We have also discovered that when cream is treated by this process it can be churned at much lower temperatures than under ordinary conditions without producing the gaseous foams which under ordinary conditions appear if churning is attempted at low temperatures, and which foaming prevents proper "breaking" of the cream into butter. Under our process the globules of butter fat are so acted upon that they more readily assimilate and more easily form into butter. There is no formation of gases in churning at low temperatures under our process inasmuch as our treatment of the cream previous to churning prevents it, therefore cream may be churned by our process at temperatures below 50 degrees Fahrenheit without any foaming, thus producing butter of greater firmness, higher quality, free of excess moisture and possessing better keeping properties.

The length of time the liquid is to be treated depends upon the density, temperature, and fat contents of the material being treated, also upon the quality of the gas and the precise method of bringing about contact between the gas and the material treated. We have found that under proper operating conditions a treatment of from fifteen to forty minutes is usually sufficient. Milk or cream for any ordinary uses may also be purified by this process. When the gas from tank 5 is carried away by pipe 7 we may provide some suitable means for exhausting the gas from the pipe and tank, such as the exhaust fan 8.

We claim:

1. The process of treating milk, cream, butter fats, etc., which consists in passing air through a solution of an unstable salt of hypochlorous acid and then passing the resultant gaseous product under pressure through the milk, cream or butter fats.

2. The process of treating milk, cream or butter fats, etc., which consists in providing a solution of a combination of unstable salts of hypochlorous acid in water, then diluting the solution and passing air through it, then passing this air with the gaseous additions received thereto through the material to be treated.

3. The process of treating milk, cream, butter-fats, etc., which consists in bringing the particles thereof into intimate contact with the gaseous product derived by forcing air through a solution of unstable salts of hypochlorous acid.

4. The process of treating milk, cream, butter-fats, etc. which consists in forcing therethrough a diluted hypochlorous acid gas.

5. The process of treating milk, cream or butter fats, etc., which consists in producing a mixture of air and hypochlorous acid, then bringing such mixture into intimate contact with the particles of milk, cream or butter fats.

In testimony whereof, we affix our signatures in the presence of two witnesses this 24th day of June 1913.

ARTHUR O. FOX.
RUSSELL R. BATES.

Witnesses:
DENIE A. WALTERS,
BESSIE S. RICE.